United States Patent [19]

Arenhold

[11] Patent Number: 4,629,204
[45] Date of Patent: Dec. 16, 1986

[54] METHOD FOR FIXING A MUD FLAP TO A MOTOR VEHICLE, A MUD FLAP AND A DEVICE FOR PERFORMING THE METHOD

[76] Inventor: Knut Arenhold, Westend 7, 2000 Hamburg 52, Fed. Rep. of Germany

[21] Appl. No.: 619,137

[22] Filed: Jun. 11, 1984

[30] Foreign Application Priority Data

Jun. 11, 1983 [DE] Fed. Rep. of Germany ....... 3321148

[51] Int. Cl.$^4$ .............................................. B62D 25/16
[52] U.S. Cl. .............................................. 280/154.5 R
[58] Field of Search .................... 280/154.5 R, 153 R, 280/155; 248/309.1, 229, 231.5

[56] References Cited

U.S. PATENT DOCUMENTS 3,158,386 11/1964 Tillinghast et al. .......... 280/154.5 R

FOREIGN PATENT DOCUMENTS 2410591 6/1979 France .......................... 280/154.5 R Primary Examiner—John J. Love
Assistant Examiner—Michael Mar
Attorney, Agent, or Firm—Murray and Whisenhunt

[57] ABSTRACT

A mud flap member with a main flap body and an adapter protrusion extending from the upper end of the main flap body is fixed to a motor vehicle body by a portion of its adapter protrusion in such a way that between the motor vehicle body and the adapter protrusion gaps are formed which are too large to substantially retain water therein by capillary action. These gaps are created by providing projections on the surface of that portion of the adapter protrusion in contact with the motor vehicle body or interposing a spacer having such projections between the mud flap and the motor vehicle body.

27 Claims, 8 Drawing Figures

METHOD FOR FIXING A MUD FLAP TO A MOTOR VEHICLE, A MUD FLAP AND A DEVICE FOR PERFORMING THE METHOD

BACKGROUND OF THE INVENTION

1. Field of the Invention

This invention relates to a method for fixing a mud flap to a motor vehicle. More particularly, this invention relates to a method for fixing a mud flap, comprising a main flap body and an adapter protrusion extending from the upper end of the main flap body, to a motor vehicle wherein the mud flap is screwed or clamped to the vehicle body so that at least part of the adapter protrusion and, optionally, part of the main flap part engages the motor vehicle body.

2. Description of the Prior Art

Such mud flaps are known (British Pat. No. 2,037,679 corresponding to U.S. Pat. No. 4,315,634) and are widely used both as front wheel and rear wheel mud flaps. Generally, such mud flaps are fixed in such a way that the inner marginal area of the adapter protrusion, i.e. the area which is adjacent to the adapter protrusion edge and located opposite the common outer edge of the main flap body and the adapter protrusion, is engaged with the fender fold of a motor vehicle. The fender fold, as is well-known, being the in-turned edge of a motor vehicle at the mudguard or fender. The mud flap is oriented in this position and is then fixed to the vehicle, for example, with clamps engaging around the fender fold and the marginal area of the adapter protrusion or with screws penetrate the marginal area and screwed into the fender fold. This marginal area of the adapter protrusion can be bent somewhat out of the plane of the main flap body and the remainder of the adapter protrusion, in order to bring about a compensation to the fold slope, and/or the inner marginal area of the adapter protrusion can be provided with a bendable reinforcing plate extending up to the main flap body (as known from British Pat. No. 1,442,226 corresponding U.S. Pat. No. 3,953,053), in order to permit a subsequent orientation of the fitted mud flap.

When fitting such mud flaps to motor vehicles, a surface of the mud flap, conventionally a surface formed by the inner marginal area of the adapter protrusion, engages with the vehicle body at the fender fold and is pressed by clamps or screws against the vehicle body. Due to this flat engagement, which is obviously not ideally flat, between the adapter protrusion surface and the adjacent vehicle body, small gaps exist in which water can collect. Due to the dimensions of these gaps and the resulting capillary forces, the water can be kept in said gaps and can be sucked into adjacent, even smaller gaps. These moisture deposits are not removed by the slipstream in dry weather and instead only gradually disappear due to evaporation. Thus, such moisture deposits lead to corrosion of the vehicle body.

Due to the engagement of part of the mud flap member on the vehicle body, discolorations to adjacent body areas can occur, because plasticizer migrates out of the mud flap material, which generally is rubber or a plastic. When choosing the mud flap material, it is necessary to take account of the fact that such plasticizer migrations must be prevented to the greatest possible extent, i.e. a relatively high-quality material must be used for the manufacture of the mud flaps.

In another known mud flap with a main flap body and an adapter protrusion (British published application No. 2,042,619 corresponding to U.S. Pat. No. 4,323,262), roughened portions are provided on the inner marginal area of the adapter protrusion engaged with the fender fold to give the mud flap a better hold on the latter. These roughened portions are naturally relatively flat, so that on engaging the fender fold gaps form between the surface of the adapter protrusion and the fender fold, which have such a limited height that considerable capillary forces act on the entering water, so that the water is generally held even more "firmly" between the adapter protrusion and the vehicle body and, consequently, more "firmly" in contact with the latter than in the case of the previously described mud flaps with a smooth surface. In the case of such mud flaps there is still a risk of plasticizer migration onto the vehicle body.

SUMMARY OF THE INVENTION

The object of the present invention is to avoid water deposits between mud flaps and the vehicle body, whilst reducing the risk of plasticizer migration onto the latter.

To solve the problem of water deposition, a method has been developed wherein projections are provided between the actual engagement area of the adapter protrusion and, optionally, the main flap body and the vehicle body. These projections cause the formation of gaps between the vehicle body and the mud flap, when assembled. The projections are of such a height and so spaced apart that the gaps so-formed are too large to substantially retain water therein by capillary action.

A mud flap, with such projections provided thereon; and a device, with such projections provided thereon, for adapting a conventional mud flap to such use have also been developed to effectuate the method.

BRIEF DESCRIPTION OF THE DRAWING FIGURES

DETAILED DESCRIPTION OF THE INVENTION

Figure 1:
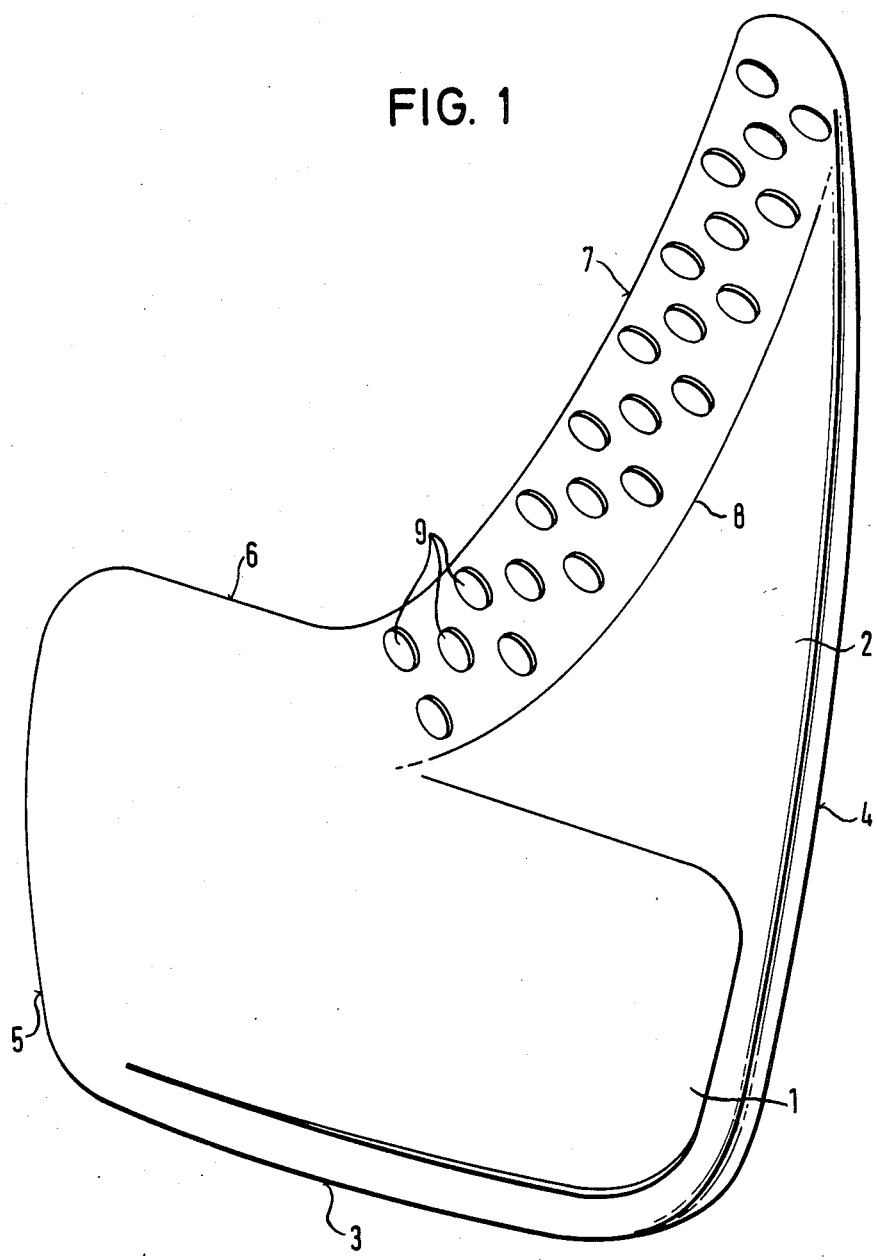
FIG. 1 is a view of a mud flap with circular projections provided on the inner marginal area of the adapter protrusion.

The fitting of a mud flap to a vehicle body, e.g., the engagement of the inner marginal area on the fender fold whilst interposing such projections results in that only the latter are in contact with the vehicle body, whilst the adjacent surface area of the mud flap is, due to the height of the projections, at such a distance from the body, that water entering the space between the latter and the mud flap immediately, flows away, i.e. is not held by capillary action. In addition, due to the dimensioning of this spacing, dirt deposits in this area are removed by the outflowing water. When traveling, air flows through the gaps formed by the spacing and brings about a rapid drying.

It should be noted that the maximum height of the projections used is substantially determined by the strength of the mud flap material and by the desired optical impression, because on the one hand a deformation of the mud flap in the area between the projections is to be avoided and because on the other hand the distance between the vehicle body and the mud flap must not be sufficiently large that the observer will look upon it as unattractive. Preferably, the projections are of a height of at least 0.5 mm and, most preferably, of a height of 1 to 3 mm. Obviously, the distance between adjacent projections must be large enough to ensure that no capillary spaces are formed, i.e. the distance is at least as large as the height of the projections, but is preferably between 5 and 15 mm.

Due to the fact that contact with the vehicle body only takes place via the projections, the plasticizer migration is also reduced, whereas in the case of known mud flap attachments this can take place over a large engagement surface area.

For performing the method according to the invention, a mud flap can be used which, on the inner marginal area of the adapter protrusion, in the fitted state, has spaced projections, whose height is preferably 0.5 mm and most preferably 1 to 3 mm. The projections can be constructed in one piece with the mud flap.

Preferably, the projections are in the form of ribs, so that said ribs form guidance surfaces for the downward draining away of the entering water in the direction of the main flap body. For this purpose, therefore, one end of each rib can be nearer to the main flap body than the other end of the rib, i.e. with the mud flap fitted the rib passes upwards or slopes upwards from one end.

In order to obtain a minimum contact surface between the ribs and the vehicle body, the width of the ribs can decrease on increasing height from the adapter protrusion surface, so that there are only very small contact surfaces and consequently moisture is only held to a very limited extent between the ribs and the vehicle body.

Mud flaps are also known, in which an elongated engagement or contact lip is fitted at a distance from the inner edge of the adapter protrusion in the assembled state, said lip inclined towards the surface of the adapter protrusion and in the direction of the inner edge. With the mud flap fitted, this engagement lip engages on the outer surface of the vehicle body and consequently forms an optical transition from the mud flap to the vehicle body.

In the case of such a mud flap, there is a particularly high risk of water depositing between the engagement lip and the vehicle body and in order to prevent such water deposits, the engagement lip face facing the adapter protrusion surface can be provided with projections having a height of at least 0.5 mm and preferably 1 to 3 mm. The engagement lip preferably has apertures therethrough adjacent to the adapter protrusion surface.

As a result of the projections, the same advantages are obtained for the area between the engagement lip and the vehicle body as through the projections positioned between the inner marginal area of the adapter protrusion and the vehicle body, particularly the fender fold. The water entering the area between the engagement lip and the vehicle body which is no longer retained by capillary forces, can either flow out at the bottom of the engagement lip or through the apertures provided in the latter.

The projections provided between the engagement lip and the vehicle body preferably comprise ribs extending between the adapter protrusion surface and the free edge of the engagement lip. At least one aperture is provided between adjacent ribs. The use of ribs ensures a favorable guidance of the water to the openings. The projections and/or ribs are preferably constructed in one piece with the engagement lip.

If a conventional mud flap is to be fitted according to the method according to the invention, without making changes to the mud flap, it is also possible to use an elongated spacer or connecting piece having projections substantially extending from the face of the spacer which will contact the vehicle body and which preferably have a height of at least 0.5 mm and most preferably 1 to 3 mm, said projections preferably being formed by first ribs.

During assembly, such a spacer can be arranged between the area of the mud flap, e.g., the inner marginal area of the adapter protrusion, which engages on the vehicle body, e.g., the fender fold and the actual vehicle body, so that it is firmly held in the assembled state between the mud flap member and the vehicle body. The spacer then leads to the same advantages as a correspondingly constructed, aforementioned mud flap.

In the case of such a spacer, it is also appropriate if the width of the first ribs is greater at the base thereof than at the tip, because as a result, the contact surface with the vehicle body is reduced.

For positioning the spacer and for producing an optical transition between the mud flap and the vehicle body, an engagement lip can be provided on one longitudinal side of the spacer which rises from the face of the spacer which will contact the vehicle body, whereby second ribs are provided on the surface facing the first ribs and the height thereof is preferably at least 0.5 mm and most preferably 1 to 3 mm and between which there is at least one aperture extending into the plane of the bases of the first ribs.

The construction and function of such a spacer in the assembled state together with the mud flap corresponds to that of a mud flap with an engagement lip, as explained hereinbefore.

The invention is described hereinafter relative to non-limitative embodiments and the attached drawings.

In the represented embodiments, corresponding parts and areas are given the same reference numerals.

The mud flap shown in FIG. 1 has a substantially rectangular main flap body 1, which is defined by a lower edge 3, an inner lateral edge 5 and an outer lateral edge 4. The upper lateral edge 6 and its imaginary extension in the direction towards the outer lateral edge 4 forms an upward limitation to the main flap body. In the plane of the main flap body 1, there is upwardly connected thereto an adapter protrusion 2, whose outer edge is formed by the upwards extension of edge 4, whilst its inner edge 7 slopes upwards and outwards from the upper edge 6 of the main flap body 1. The represented side of the mud flap is that which points rearwards in the fitted state, i.e. is remote from the wheel. A mud flap in this form is, for example, shown in British Pat. No. 2,037,679. In accordance with this known mud flap, the mud flap of FIG. 1 also has a bending line 8, i.e. the area between line 8 and edge 7 and optionally also part or all the upper marginal area of the main flap body are bent somewhat out of the plane of the latter and the remainder of the adapter protrusion 2, in order to bring about the normal slope of the fender fold and as is also described in British Pat. No. 2,037,679.

In the inner marginal area of the adapter protrusion between bending line 8 and edge 7 are provided circular projections, whose height is at least 0.5 mm and is preferably 1 to 3 mm. The distance between the projections is approximately 5 to 15 mm. The projections are constructed in one piece with the mud flap, which is conventionally made from rubber.

When assembling the represented mud flap, projections 9 are engaged on the fender fold of the motor vehicle, followed by fixing, usually by means of clamps, which engage both round the fender fold and the adjacent inner marginal area of the adapter protrusion 2 of the mud flap member. Such a fixture is shown in British published application No. 2,042,619.

In the assembled state, the upper surfaces of projections 9 engage with the fender fold, whilst the adjacent surface of adapter protrusion 2 is at a distance from the fender fold, which is determined by the height of the projections 9 and the elasticity thereof, i.e. the distance corresponds to the height of the projections in the state pressed against the fender fold. However, as the mud flap material is relatively resistant to compression, the height of the projections 9 is not significantly reduced by the contact pressure, so that there is preferably a spacing of 1 to 3 mm and the resulting free space between the surface of adapter protrusion 2 and the fender fold makes it possible for entering water to flow away, as well as for air to flow through, which removes existing moisture.

Figure 2:
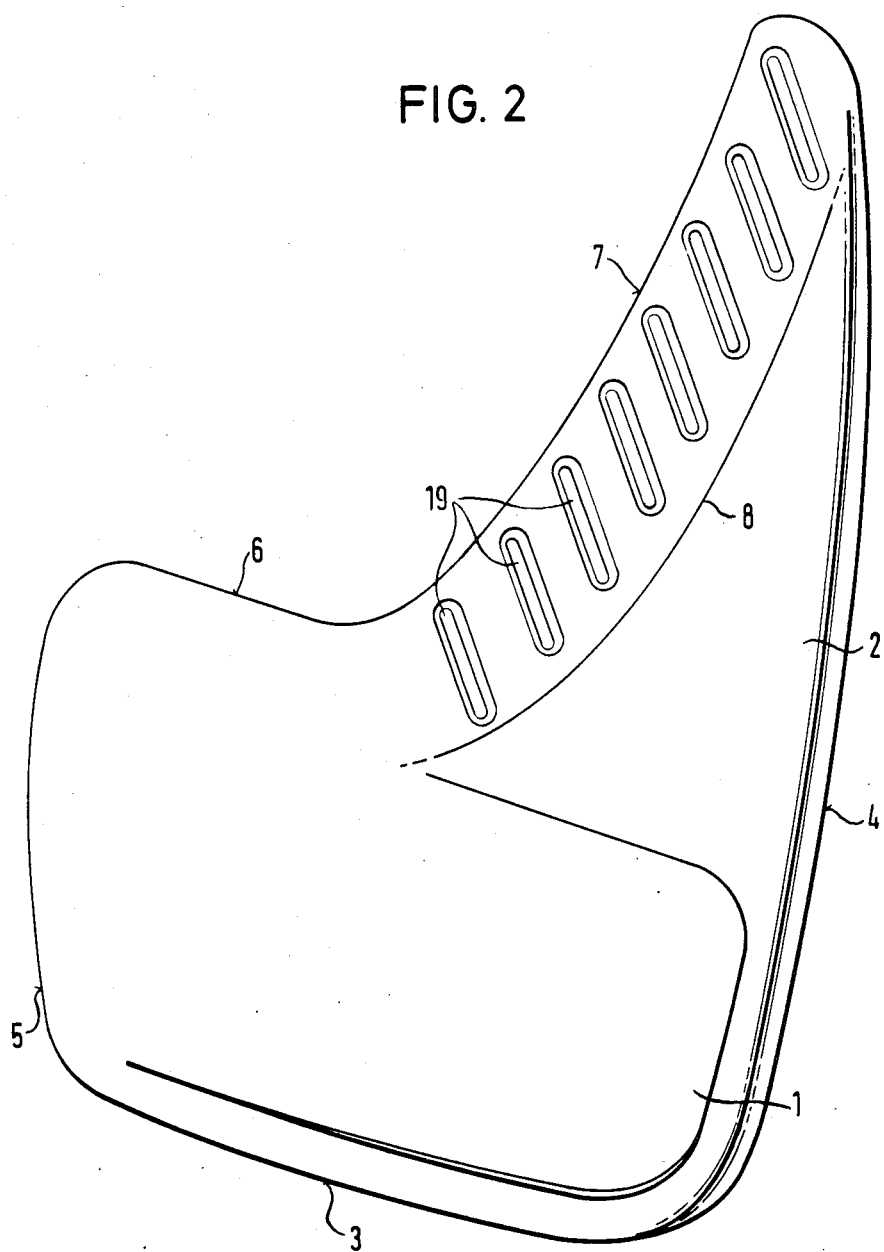
FIG. 2 is a view, corresponding to FIG. 1, of a mud flap with projections in the form of straight ribs provided on the inner marginal area of the adapter protrusion.

The mud flap shown in FIG. 2 essentially corresponds to that of FIG. 1, but the projections have a differing form, namely that of straight ribs 19, whose ends closer to the edge 7 of adapter protrusion 2 are higher than the end thereof remote from edge 7. Ribs 19 run parallel to one another and are spaced apart by a distance of preferably 5 to 15 mm. Their height corresponds to the height of projections 9 in FIG. 1, but their width decreases with increasing height, so that the rib surface engaging on the fender fold is very narrow.

In the assembled state, ribs 19 have the same action and function as projections 9 in FIG. 1, the represented slope of ribs 19 aiding the downward outflow of penetrated water.

Figure 3:
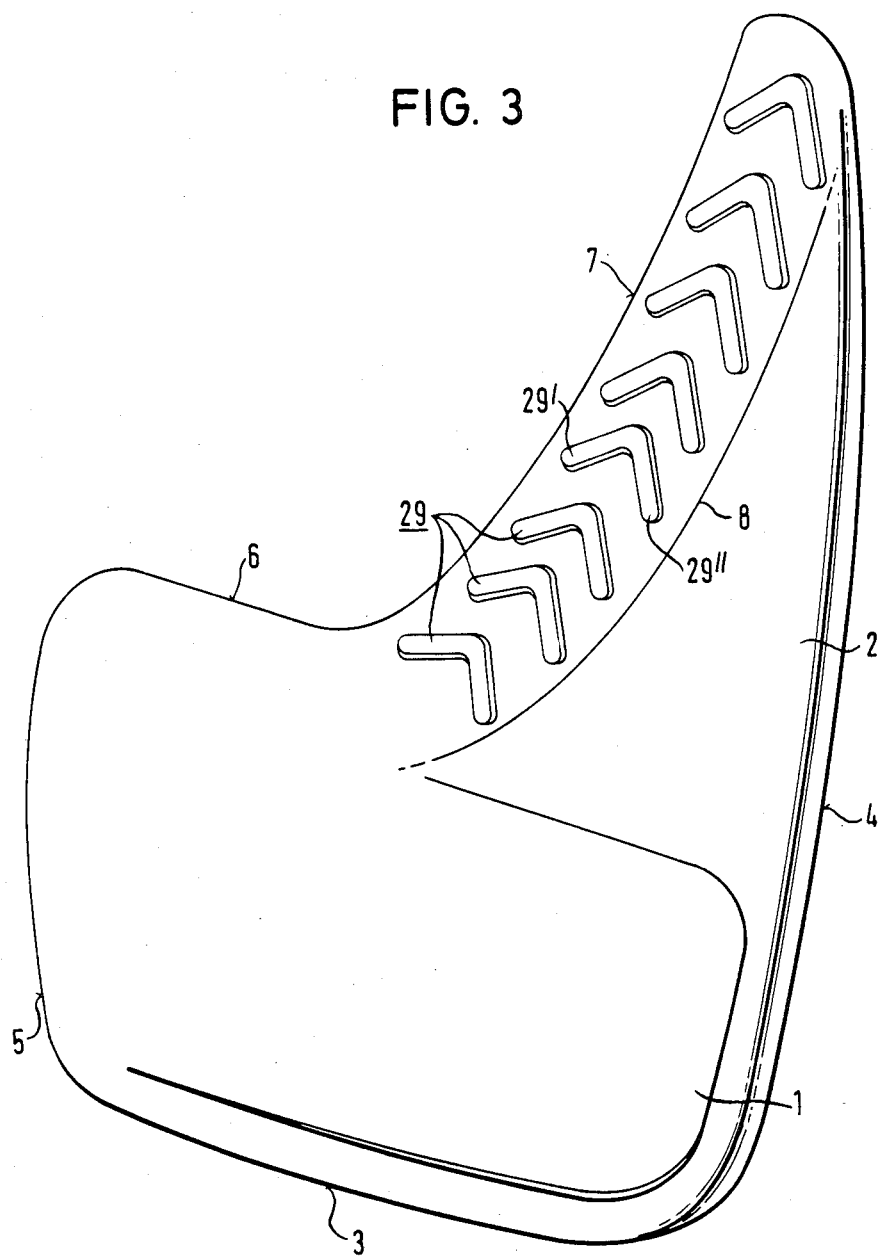
FIG. 3 is a view, corresponding to FIGS. 1 and 2, of a mud flap with bent ribs provided on the inner marginal area of the adapter protrusion.

The mud flap according to FIG. 3 corresponds to those of FIGS. 1 and 2. The projections are formed by bent ribs 29, so that they have two legs 29' and 29''. The corresponding legs of all the ribs run parallel to one another and with a spacing corresponding to that of ribs 19 in FIG. 2. Legs 29'' of ribs 29 slope in substantially corresponding manner to ribs 19, whilst legs 29' are at right angles thereto.

Figure 4:
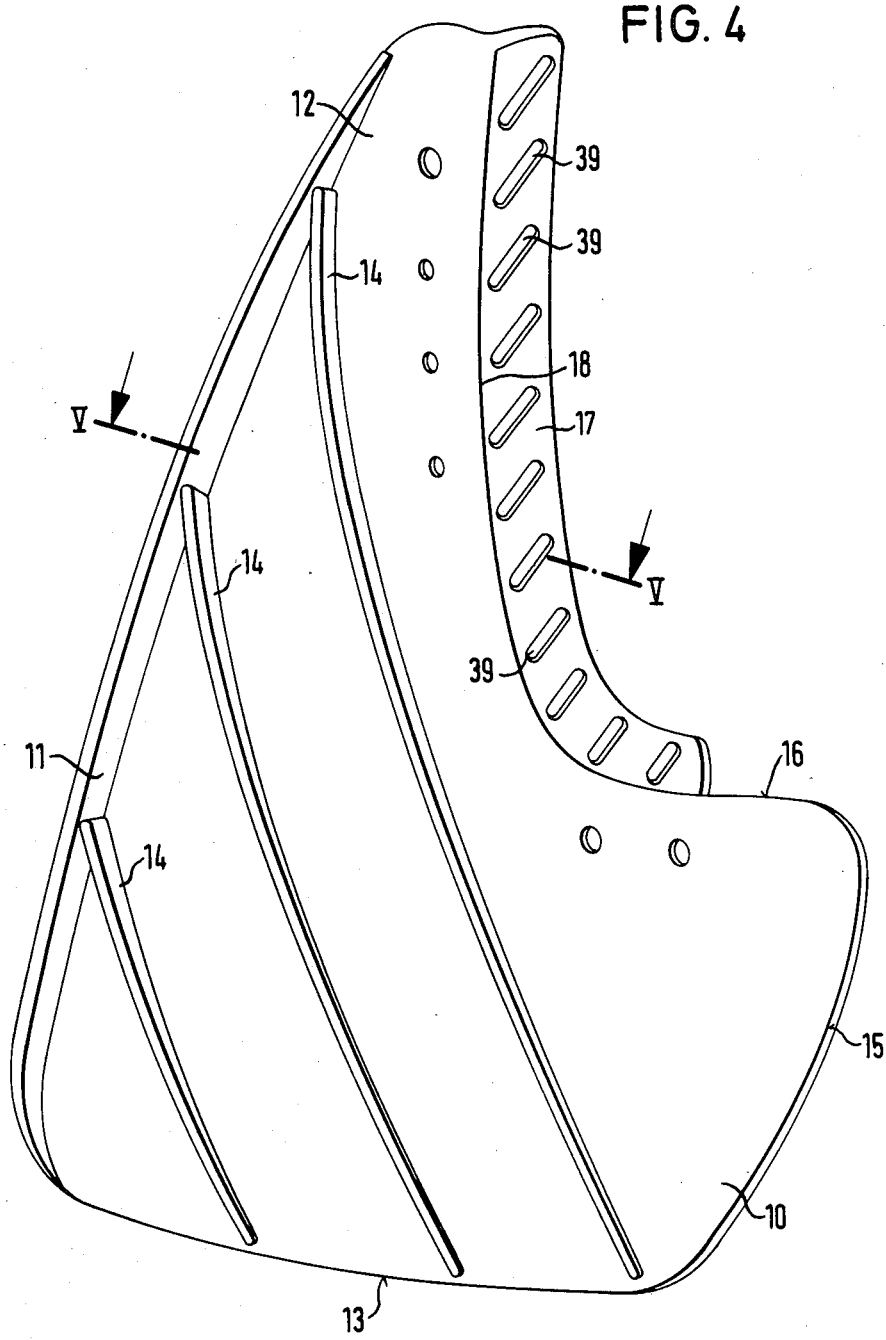
FIG. 4, is a view of the side of another mud flap with projections in the form of ribs and which in the fitted state faces the wheel.
Figure 5:
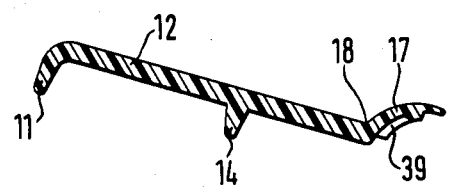
FIG. 5, is a sectional view of a mud flap taken along line A-B of FIG. 4.

FIGS. 4 and 5 show a modified mud flap, which has a main flap body defined by the inner edge 15 and outer rib 11, as well as the lower edge 13, whilst said flap body is bounded at the top by edge 16 and its imaginary extension in the direction of rib 11. An adapter protrusion 12 is connected at the top to the main flap body 10 in the plane thereof, the outer edge of protrusion 12 being formed by rib 11. Ribs 14 slope downwards from rib 11. The construction of the mud flap to this extent corresponds to the construction of the mud flap of British Pat. No. 2,037,679 and the represented mud flap surface is that which faces the wheel in the assembled state.

The marginal area of the adapter protrusion 12 opposite to rib 11 is formed by a lip 17 bent about line 18 in the direction of the rear face of adapter protrusion 12 (FIG. 5), said lip extends into the area of the main flap body 10. This lip carries sloping ribs 39, whose height, spacings and slope substantially correspond to those of ribs 19 of FIG. 2. The ribs can be constructed in one piece with lip 17 and consequently in one piece with the mud flap.

For assembly purposes, the mud flap is positioned in such a way with respect to the wheel opening, that ribs 39 engage on the outer face of the vehicle body adjacent to the wheel opening and fixing can then take place either by screws screwed through the lip and the vehicle body, or by struts. Thus, for this purpose, the struts can be fitted on the one hand to points in the wheel case and on the other to the mud flap, which for this purpose has the openings or penetratable regions indicated in FIG. 4 through which can be placed attachment screws. In this embodiment, ribs 39 once again have the same function as described in conjunction with the projections of FIG. 1 and the ribs according to FIGS. 2 and 3.

Figure 6:
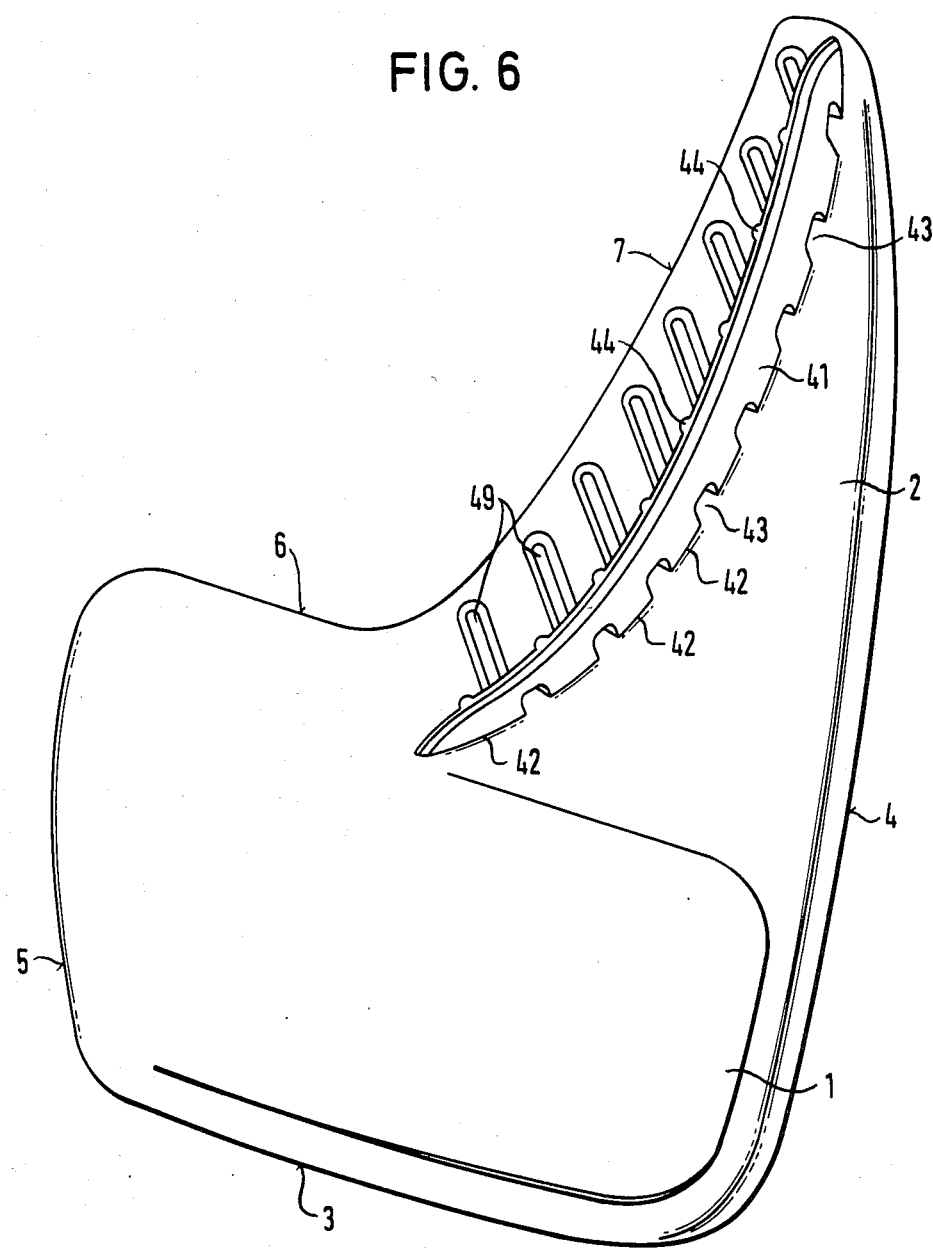
FIG. 6, is a view, corresponding to FIGS. 1 to 3, of a mud flap with ribs similar to the mud flap according to FIG. 2, but with an engagement lip.

The mud flap of FIG. 6 is similar to that of FIG. 2, the ribs 49 corresponding to ribs 19 in FIG. 2. In addition, the mud flap has an engagement lip 41 spaced from edge 7 and substantially parallel to the latter, said lip being provided on the side of the adapter protrusion 2 carrying ribs 49 and is constructed in one piece with the mud flap member. The distance between engagement lip 41 and edge 7 is greater in the connecting area of lip 41 and protrusion 2 than in the area of the free edge of lip 41, i.e. the latter slopes in the direction of edge 7. On the side of engagement lip 41 facing ribs 49 are formed ribs 44, which extend over the entire height of lip 41 and pass at their lower end into a rib 49 in each case.

Between two ribs 44, there is an aperture 43 in the engagement lip and this extends to the surface of adapter protrusion 2, or in the lower area of engagement lip 41, to the surface of the main flap body 1. The boundary surface of openings 43 closer to the lower edge 3 of the main flap body and emanating from the surface of adapter protrusion 2 or the main flap body 1 is aligned with the side walls of ribs 44, 49 at the top in FIG. 6, so that water guided by a rib 44 and/or a rib 49 flows directly into and through opening 43, i.e. is not held back at a wall portion of engagement lip 41 between ribs 44, 49 and the adjacent opening 43.

It should be noted that ribs 44 and 49 need not be interconnected, and can instead end shortly before the transition from engagement lip 41 to adapter protrusion 2. In this case, water can also flow away along engagement lip 41.

For the assembly of the mud flap according to FIG. 6, the ribs 49 are engaged on the fender fold, engagement lip 41 engaging on the outside of the vehicle body. The fixing can then take place in the same way as explained in connection with FIG. 1.

Figure 7:
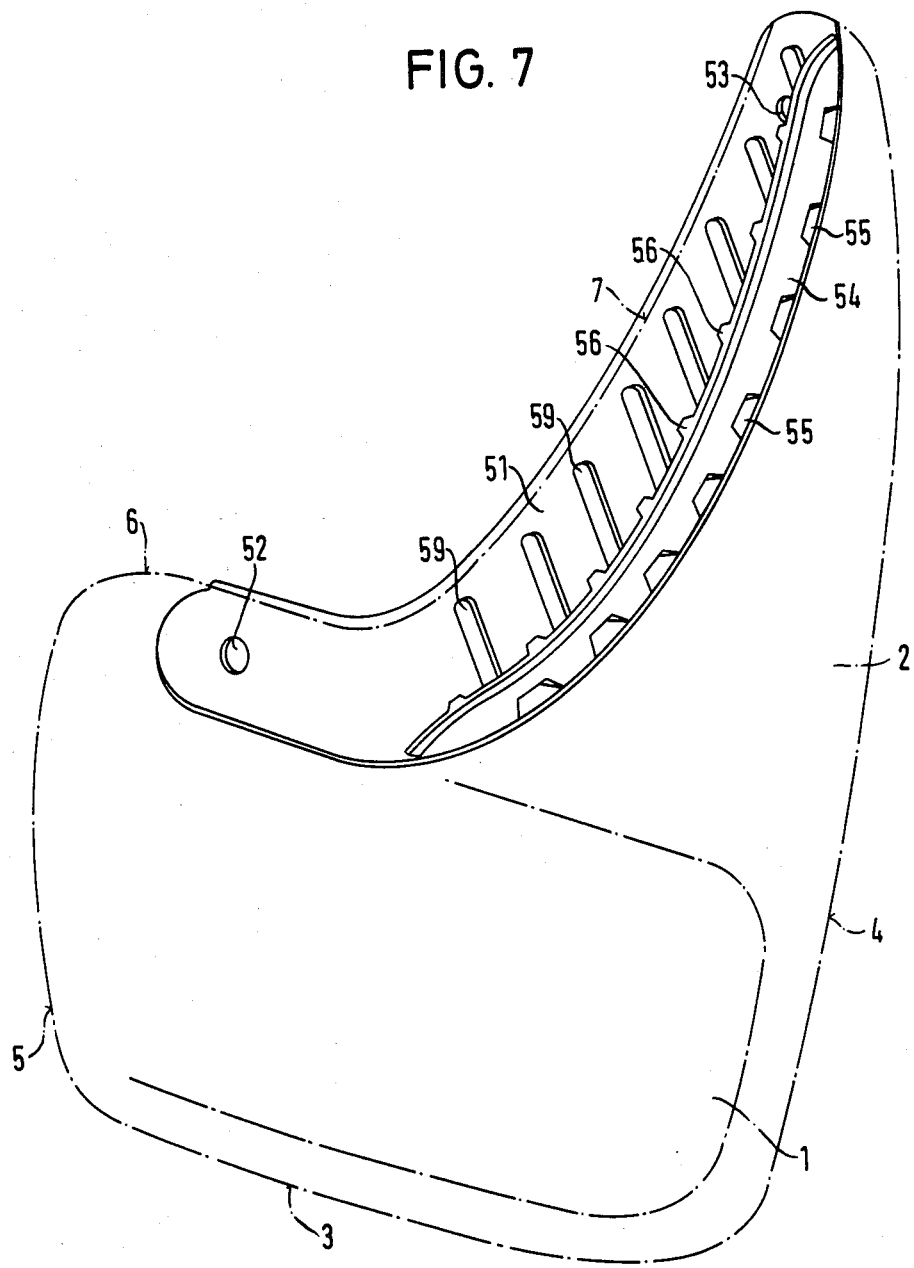
FIG. 7 is a view of an elongated spacer, for fitting a mud flap to a fender fold, the mud flap being indicated by dot-dash lines.

FIG. 7 shows a mud flap corresponding to that of FIG. 1, but without the projections in the vicinity of the adapter protrusion. The mud flap is in this case shown by dot-dash lines.

On the mud flap according to FIG. 7 is provided a spacer, which has a planar base plate 51, which can be fixed to the mud flap by means (not shown) of screws or rivets passed through the bores 52 and 53. In this position, base plate 51 passes through the entire inner marginal area of adapter protrusion 2, as well as part of the upper marginal area of the main flap body 1.

On the edge of base plate 51 remote from edge 7 of adapter protrusion 2 is formed an engagement lip 54, which has openings 55 and which carries ribs 56 on its side facing edge 7 and said ribs pass into ribs 59 on base plate 51. Engagement lip 54 corresponds to engagement lip 41 of FIG. 6, ribs 56, 59 to ribs 44, 49 of FIG. 6. Openings 55 and ribs 56, 59 are associated with one another in the same way as in the embodiment according to FIG. 6, i.e. the spacer of FIG. 7 after fitting to a mud flap lead to a construction, whose function is the same as that of the mud flap of FIG. 6.

Figure 8:
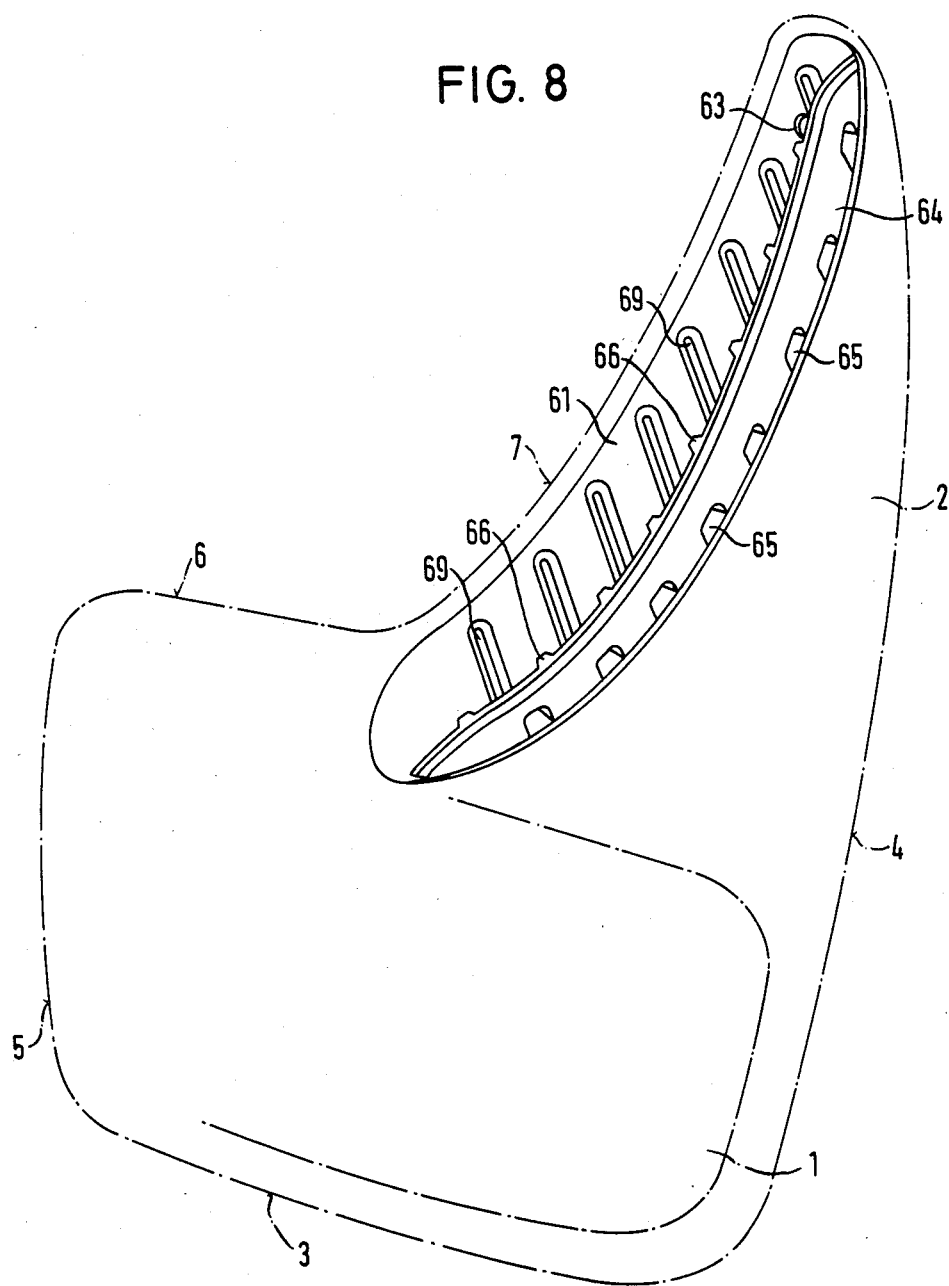
FIG. 8 is a view of another elongated spacer configuration, on a mud flap shown by dot-dash lines.

The spacer shown in FIG. 8 on a mud flap represented in dot-dash form corresponding to the mud flap of FIG. 7, corresponds in its basic construction to the spacer of FIG. 7, because it has a base plate 61 corresponding to base plate 51 with ribs 69 corresponding to ribs 59 and an engagement lip 64 with opening 65 and rib 66 corresponding to engagement lip 54 with openings 55 and ribs 56 of FIG. 7. Ribs 69 taper in the same way as ribs 19 in FIG. 2.

Differing from the spacer according to FIG. 7, the spacer of FIG. 8 is only fixed to the mud flap by means of a bore (63) provided in the upper end area, so that the position of the fixed spacer can be modified with respect to edge 7 of adapter protrusion 2 of the mud flap for adapting to different fender fold configurations.

What is claimed is:

1. In a method for fixing a mud flap to a motor vehicle comprising
   overlapping a portion of said mud flap with a portion of the motor vehicle body; and
   screwing or clamping said overlapping portions of said mud flap and said motor vehicle body to one another;
   the improvement comprising:
   interposing a plurality of spacers of predetermined uniform height between said overlapping portions of said mud flap and said motor vehicle body, said spacers being spaced apart from one another and of such a height, as to form a plurality of gaps between said mud flap and said motor vehicle body, said gaps being too large to substantially retain water therein by capillary action.

2. The method according to claim 1, wherein said spacers are of a height of at least 0.5 mm.

3. The method according to claim 2, wherein said spacers are of a height of 1 to 3 mm.

4. In a mud flap for attachment to the body of a motor vehicle, said mud flap comprising a main flap body and an adapter protrusion disposed upwardly from the main flap body, said adapter protrusion having an inner marginal area for attaching the mud flap to a motor vehicle body and for aligning the mud flap to the chassis of the motor vehicle, the improvement comprising
   a plurality of spaced apart projections of predetermined uniform height disposed on the inner marginal area of said adapter protrusion, whereby when said mud flap is attached to the body of a motor vehicle, said spaced apart projections form a plurality of gaps between said inner marginal area and said motor vehicle body, said gaps being too large to substantially retain water therein by capillary action.

5. The mud flap according to claim 4, wherein said spaced apart projections are of a height of at least 0.5 mm.

6. The mud flap according to claim 5, wherein said spaced apart projections are of a height of 1 to 3 mm.

7. The mud flap according to claim 4, wherein said spaced apart projections are formed integrally with said mud flap.

8. The mud flap according to claim 4, wherein said spaced apart projections comprise ribs of predetermined width, each rib having a first end and a second end.

9. The mud flap according to claim 8, wherein the width of said ribs decreases with increasing height from the inner marginal area of the adapter protrusion.

10. The mud flap according to claim 8, wherein one of said first end and said second end is closer to the main flap body than the other of said first end and said second end.

11. In a mud flap for attachment to the fender fold of a motor vehicle having a vehicle body outer face, said mud flap comprising a main flap body and an adapter protrusion disposed upwardly from the main flap body, said adapter protrusion having an inner edge and an inner marginal area, adjacent said inner edge, for attaching the mud flap to a fender-fold of the motor vehicle and for aligning the mud flap to the chassis of the motor vehicle, the improvement comprising:
   an elongated engagement lip having a free edge, disposed on said adapter protrusion adjacent said inner marginal area and substantially parallel to and spaced apart from said inner edge, said engagement lip sloping upwardly from the surface of the adapter protrusion and in the direction of said inner edge, said engagement lip, when said mud flap is attached to the body of a motor vehicle, engaging the outer face of the vehicle body;
   a first plurality of spaced apart projections of predetermined height disposed on the inner marginal area of said adapter protrusion, whereby when said mud flap is attached to the fender-fold of a motor vehicle, said first plurality of spaced apart projections form a first plurality of gaps between said inner marginal area and said fender-fold, said first plurality of gaps being too large to substantially retain water therein by capillary action;
   a second plurality of spaced apart projections of predetermined height disposed on said elongated engagement lip facing toward said inner marginal area, whereby when said mud flap is attached to the fender fold of a motor vehicle, said second plurality of spaced apart projections form a second plurality of gaps between said engagement lip and said outer face of the vehicle body, said second plurality of gaps being too large to substantially retain water therein by capillary action.

12. The mud flap according to claim 11, wherein said first plurality of spaced apart projections and said second plurality of spaced apart projections are of a height of at least 0.5 mm.

13. The mud flap according to claim 12, wherein said height is 1 to 3 mm.

14. The mud flap according to claim 11, wherein said engagement lip is formed integrally with said mud flap.

15. The mud flap according to claim 11, wherein said first plurality of spaced apart projections comprise ribs of predetermined width, each rib having a first end and a second end.

16. The mud flap according to claim 15, wherein the width of each said rib decreases with increasing height from the inner marginal area of the adapter protrusion.

17. The mud flap according to claim 5, wherein one of said first end and said second end is closer to the main flap body than the other of said first end and said second end.

18. The mud flap, according to claim 11, wherein a plurality of apertures through said engagement lip are provided adjacent the surface of the adapter protrusion.

19. The mud flap according to claim 18, wherein said second plurality of spaced apart projections comprise ribs extending between the surface of the adapter protrusion and the free edge of the engagement lip and said apertures are provided between adjacent ribs.

20. An elongated spacer for interposition between a motor vehicle having a fender-fold and a vehicle body outer face and a mud flap attachable to said fender-fold, when said mud flap is attached to said fender-fold, said mud flap comprising a main flap body and an adapter protrusion disposed upwardly from the main flap body, said adapter protrusion having an inner edge and an inner marginal area, adjacent said inner edge, for attaching the mud flap to the fender-fold of the motor vehicle and for aligning the mud flap to the chassis of the motor vehicle, the elongated spacer comprising
- a substantially planar spacer plate corresponding in size and shape to said inner marginal area of said adapter protrusion and having a spacer inner edge corresponding to said inner edge of said adapter protrusion, said spacer plate having a first face engageable with said fender-fold and a second face engageable with said inner marginal area of said adapter protrusion;
- said first face provided with a plurality of spaced apart projections of predetermined uniform height, whereby when said first face is engaged with said fender-fold, said spaced apart projections form a plurality of gaps between said first face and said fender fold, said gaps being too large to substantially retain water therein by capillary action.

21. The elongated spacer according to claim 20, wherein said spaced apart projections are of a height of at least 0.5 mm.

22. The elongated spacer according to claim 21, wherein said spaced apart projections are of a height of 1 to 3 mm.

23. The elongated spacer according to claim 20, wherein said spaced apart projections comprise first ribs of predetermined width.

24. The elongated spacer according to claim 23, wherein the width of said first ribs decreases with increasing height from said first face.

25. An elongated spacer for interposition between a motor vehicle having a fender-fold and a vehicle body outer face and a mud flap attachable to said fender fold, when said mud flap is attached to said fender-fold, said mud flap comprising a main flap body and an adapter protrusion disposed upwardly from the main flap body, said adapter protrusion having an inner edge and an inner marginal area, adjacent said inner edge, for attaching the mud flap to the fender-flap of the motor vehicle and for aligning the mud flap to the chassis of the motor vehicle, the elongated space comprising
- a substantially planar spacer plate corresponding in size and shape to said inner marginal area of said adapter protrusion and having a spacer inner edge corresponding to said inner edge of said adapter protrusion, said spacer plate having a first face engageable with said fender-fold and a second face engageable with said inner marginal area of said adapter protrusion;
- said first face provided with a plurality of spaced apart projections of predetermined height, whereby when said first face is engaged with said fender-fold, said spaced apart projections form a plurality of gaps between said first face and said fender fold, said gaps being too large to substantially retain water therein by capillary action, said spaced apart projections comprising first ribs of predetermined width; and
- an elongated engagement lip, adapted to engage the body outer face of said vehicle, disposed on said first face of said spacer plate and substantially parallel to and spaced apart from said spacer inner edge, said engagement lip having a lip face adjacent said first ribs and a free edge remote from said first face, said lip face provided with a plurality of spaced apart second ribs extending from said spacer plate to said free edge, a plurality of apertures through said engagement lip provided adjacent said first face and each aperture located between adjacent second ribs.

26. The elongated spacer according to claim 28, wherein said second ribs are of a height of at least 0.5 mm.

27. The elongated spacer according to claim 26, wherein said height is 1 to 3 mm.

* * * * *